(12) United States Patent
Truong et al.

(10) Patent No.: US 8,706,026 B2
(45) Date of Patent: Apr. 22, 2014

(54) SYSTEM AND METHOD FOR DISTRIBUTED POWER CONTROL IN A COMMUNICATIONS SYSTEM

(75) Inventors: Kien Trung Truong, Austin, TX (US); Young Hoon Kwon, San Diego, CA (US); Philippe Sartori, Algonquin, IL (US); Mazin Al-Shalash, Frisco, TX (US)

(73) Assignee: FutureWei Technologies, Inc., Plano, TX (US)

( * ) Notice: Subject to any disclaimer, the term of this patent is extended or adjusted under 35 U.S.C. 154(b) by 381 days.

(21) Appl. No.: 13/250,016

(22) Filed: Sep. 30, 2011

(65) Prior Publication Data

US 2012/0083201 A1  Apr. 5, 2012

Related U.S. Application Data

(60) Provisional application No. 61/388,330, filed on Sep. 30, 2010.

(51) Int. Cl.
*H04B 1/60* (2006.01)
(52) U.S. Cl.
USPC .......... 455/9; 455/7; 455/11.1; 455/13.4; 455/522; 455/69; 370/310; 370/315; 370/318; 370/328; 370/338; 375/211; 375/213
(58) Field of Classification Search
USPC ......... 455/9, 7, 11.1, 13.4, 15, 16, 522, 69, 455/68, 127.1, 500, 517, 426.1, 426.2, 455/550.1, 422.1, 403, 509, 515, 507, 511; 370/310, 315, 318, 322, 326, 328, 329, 370/330, 336, 338, 343; 375/211, 213
See application file for complete search history.

(56) References Cited

U.S. PATENT DOCUMENTS

| | | | |
|---|---|---|---|
| 2005/0255808 A1 | 11/2005 | Ahmed et al. | |
| 2008/0080436 A1* | 4/2008 | Sandhu et al. | 370/338 |
| 2008/0119216 A1 | 5/2008 | Lee et al. | |
| 2008/0198906 A1 | 8/2008 | Kim et al. | |
| 2008/0214182 A1 | 9/2008 | Wang et al. | |
| 2008/0227561 A1 | 9/2008 | Dahl | |
| 2009/0053994 A1 | 2/2009 | Senarath et al. | |
| 2010/0067427 A1 | 3/2010 | Choudhury | |
| 2013/0188507 A1* | 7/2013 | Dayal et al. | 370/252 |

* cited by examiner

*Primary Examiner* — Keith Ferguson
(74) *Attorney, Agent, or Firm* — Slater & Matsil, L.L.P.

(57) ABSTRACT

An embodiment method for power control in a multi-hop communications system includes transmitting a power usage pattern for each relay node in a subset of relay nodes served by a communications controller, where the power usage pattern specifies transmit power levels for the relay node while the relay node is operating in a power control mode. The method also includes receiving channel measurements of access links between the relay nodes in the subset of relay nodes and subscriber equipment served by the relay nodes, determining backhaul link transmit power levels and access link transmit power levels based on the channel measurements of access links and channel measurements of backhaul links between the communications controller and the relay nodes, and transmitting the access link power levels to the subset of relay nodes.

24 Claims, 6 Drawing Sheets

SYSTEM AND METHOD FOR DISTRIBUTED POWER CONTROL IN A COMMUNICATIONS SYSTEM

This application claims the benefit of U.S. Provisional Application No. 61/388,330, filed on Sep. 30, 2010, entitled "Method for Power Control at the Base Station and at the Relay Nodes in a Wireless Relay Network," which application is hereby incorporated herein by reference.

TECHNICAL FIELD

The present invention relates generally to digital communications, and more particularly to a system and method for distributed power control in a communications system.

BACKGROUND

In upcoming wireless communications systems, such as The Third Generation Partnership Project (3GPP) Long Term Evolution-Advanced (LTE-Advanced), relay nodes and relay communications are being considered as an effective solution in providing extended coverage and/or improved data rate. For example, in a downlink of a relay-based communications system, a base station (BS) (also commonly referred to as a controller, communications controller, NodeB, enhanced NodeB (eNB), and so on) may transmit to a relay node (RN), which in turn retransmits to a mobile station (MS) (also commonly referred to as a subscriber, subscriber equipment, terminal, user, User Equipment (UE), and so forth).

Typically, in a multi-user communications system, inter-link interference may have a significant impact on overall performance of the communications system. For example, inter-link interference may significantly reduce the system performance, such as a sum of the data rates of links simultaneously utilizing the same radio frequency resource.

Power control is a well established technique for improving the sum of the data rate of multi-user communications systems. A variety of power control techniques and protocols have been proposed for power control in multi-user communications systems. However, they tend to be optimized for single-hop power control algorithms and do not typically apply to communications systems with relay nodes since such systems are multi-hop systems.

SUMMARY OF THE INVENTION

These and other problems are generally solved or circumvented, and technical advantages are generally achieved, by embodiments of the present invention which provides a system and method for distributed power control in a communications system.

In accordance with an example embodiment of the present invention, a method for power control in a multi-hop communications system is provided. The method includes transmitting a power usage pattern for each relay node in a subset of relay nodes served by a communications controller, where the power usage pattern specifies transmit power levels for the relay node while the relay node is operating in a power control mode. The method also includes receiving channel measurements of access links between each relay node in the subset of relay nodes and subscriber equipment served by the relay node, determining backhaul link transmit power levels and access link transmit power levels based on the channel measurements of access links and channel measurements of backhaul links between the communications controller and each relay node in the subset of relay nodes, and transmitting the access link power levels to the subset of relay nodes.

In accordance with another example embodiment of the present invention, a method for relay node operations is provided. The method includes receiving a power usage pattern specifying transmit power levels for a relay node, transmitting a signal based on the power usage pattern to assist subscriber equipment served by the relay node in making channel measurements, receiving the channel measurements from the subscriber equipment, sending the channel measurements to a communications controller serving the relay node, receiving a transmit power level from the communications controller, and transmitting at the transmit power level to the subscriber equipment.

In accordance with another example embodiment of the present invention, a communications controller is provided. The communications controller includes a transmitter, a receiver, and a processor coupled to the transmitter and to the receiver. The transmitter transmits a power usage pattern for each relay node in a subset of relay nodes served by a communications controller, where the power usage pattern specifies transmit power levels for the relay node while the relay node is operating in a power control mode, and transmits access link power levels to the subset of relay nodes. The receiver receives channel measurements of access links between each relay node in the subset of relay nodes and subscriber equipment served by the relay node. The processor determines backhaul link transmit power levels and access link transmit power levels based on the channel measurements of access links and channel measurements of backhaul links between the communications controller and each relay node in the subset of relay nodes.

One advantage of an embodiment is that the use of a power pattern to specify transmission behavior of RNs during power control operation helps to simplify the measurement of channels as well as coordinate transmissions between multiple RNs. Knowledge of the transmission patterns of the RNs may help to simplify the computation of the transmit power levels at the BSs.

A further advantage of an embodiment is that the coordination and signaling between BSs, RNs, and MSs is simple and efficient, thereby the impact of the power control on the communications system as a whole is minimized. Furthermore, the coordination and signaling enables a sequential power control implementation.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One embodiment of the invention relates to performing power control in a multi-hop communications system by determining transmit power levels for communications controllers and relay nodes based on channel measurements of a first hop and a second hop. For example, after determining a power usage pattern for transmissions by the relay nodes during a power control mode, the communications controller receives channel measurements of the second hop made by communications devices when the relay nodes are operating as specified by the power usage patterns. The communications controller determines the transmit power levels for itself based on channel measurements of the first hop and equalizes a sum of end-to-end achievable rates based on the channel measurements of the second hop. At a relay node, the relay node transmits a signal based on the power usage pattern and receives feedback related to the channel measurements of the second hop. The relay node provides the feedback to the communications controller.

The present invention will be described with respect to example embodiments in a specific context, namely a multi-user communications system with relay nodes. The invention may be applied, however, to standards compliant communications systems, such as those that are compliant with Third Generation Partnership Project (3GPP) Long Term Evolution (LTE), IEEE 802.16, WiMAX, and so on, technical standards, as well as non-standards compliant communications systems that support relay nodes. The invention is also applicable to wireless local area network (LAN) systems, such as the IEEE 802.11 family of technical standards. It may also be applicable to a communications system with an MS operating in ad-hoc mode functioning as a relay node.

Figure 1:
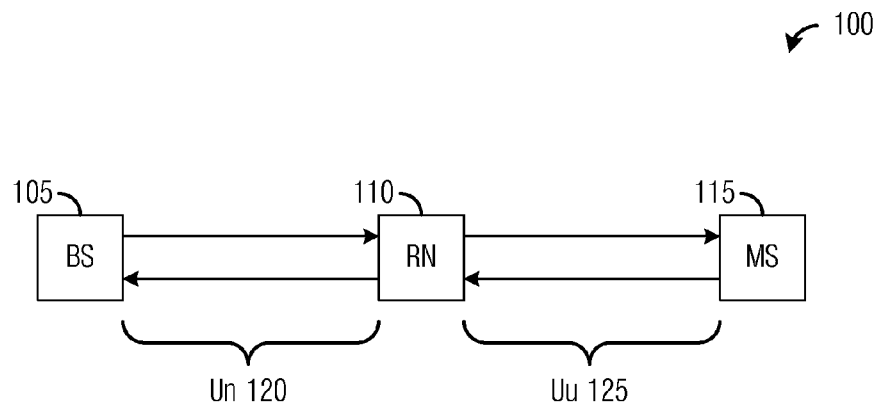
FIG. 1 illustrates an example communications system according to example embodiments described herein.

FIG. 1 illustrates a communications system 100. Communications system 100 includes a BS 105 that controls the communications of communications devices that it is serving. Communications system 100 also includes a relay node (RN) 110. A RN is considered as a tool to improve, e.g., the coverage area of high data rate communications, group mobility, temporary network deployment, the cell-edge throughput, and/or to provide coverage in new areas. The RN is wirelessly connected to a wireless communications network via a BS, such as BS 105.

Communications system 100 also includes an MS 115. MS 115 may be a communications device that may allow an operator to connect to a service, such as voice service, data service, multimedia service, and so on. As shown in FIG. 1, BS 105 has allocated some resources to RN 110, which in turn, may allocate some resources (provided by BS 105) to MS 115. Communications between BS 105 and RN 110 may be made over a communications link (uplink and/or downlink directions) referred to as a Un link 120 or a wireless backhaul link or a backhaul link, while communications between RN 110 and MS 115 may be made over communications link (uplink and/or downlink directions) referred to as a Uu link 125 or an access link.

RN 110 may be a decode-and-forward RN, which is a type of RN that is capable of decoding a transmission intended for its associated MS. In Uu link 125 (the access link), all RNs may transmit data to their associated MSs at the same time.

While it is understood that communications systems may employ multiple BSs capable of communicating with a number of MSs and RNs, only one BS, one MS, and one RN are illustrated for simplicity. In particular, BS 105 may also communicate with other RNs (not shown on the figure), and RN 110 may communicate with other MSs (not shown on the figure). Also, BS 105 may have direct communications with other MSs (not shown on the figure).

Figure 2:
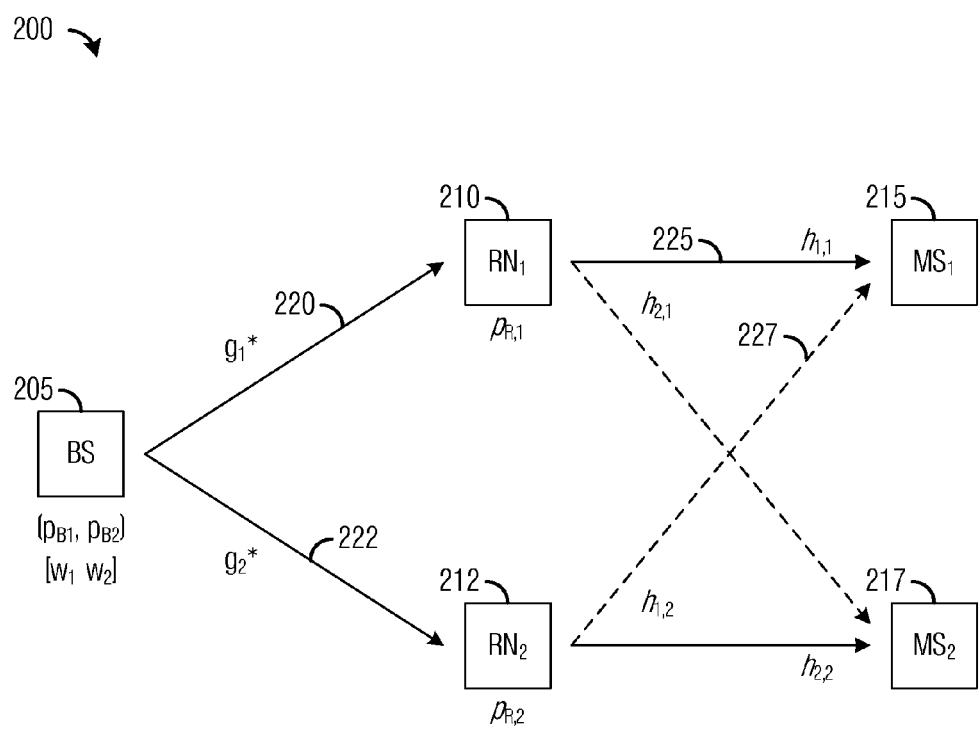
FIG. 2 illustrates an example model of a two-hop interference channel in a multi-user communications system according to example embodiments described herein.

FIG. 2 illustrates a model 200 of a two-hop interference channel in a multi-user communications system. Model 200 includes a BS 205 that communicates through two RNs ($RN_1$ 210 and $RN_2$ 212). BS 205 uses the two RNs to communicate with two MSs ($MS_1$ 215 and $MS_2$ 217). As an example, BS 205 communicates to $MS_1$ 215 through $RN_1$ 210 and $MS_2$ 217 through $RN_2$ 212. Generally, it is also possible for a BS to directly communicate with a MS (e.g., over a direct link). This configuration is not shown here. It is noted however that the inclusion of direct links is considered to be well understood by those of ordinary skill in the art of the example embodiments. It is also noted that while only two RNs are shown here, there might be more than two or less than two RNs present in the system. Similarly, there might be more than two or less than two MSs in the system.

Generally, in a multi-user communications system, a communications device, such as a RN or a MS, may receive not only transmissions intended for it, but also transmissions not intended for it. As an example, consider $MS_1$ 215 as it receives a transmission intended for it from $RN_1$ 210 (shown as solid line 225), as well as a transmission not intended for it from $RN_2$ 212 (shown as dashed line 227). Similarly, $MS_2$ 217 may receive a transmission intended for it from $RN_2$ 212, as well as a transmission not intended for it from $RN_1$ 210. The unintended receptions may create interference that affect the system performance and may reduce throughput and/or coverage.

Although the discussion presented herein focuses on two MSs receiving transmissions from a single BS through two RNs, the example embodiments may be operable with any number of MSs and RNs. Additionally, the discussion focuses on two-hop transmissions, i.e., a single RN between the BS and the MS. However, the example embodiments may be readily extendible to more than two-hop transmissions, such as three-, four-, and so on, hop transmissions. Therefore, the discussion of one BS, two MSs, and two RNs, as well as two-hop transmissions, should not be construed as being limiting to either the scope or the spirit of the example embodiments.

Let $p_{B1}$ and $p_{B2}$ be transmit power levels for BS 205 to $RN_1$ 210 and $RN_2$ 212, respectively, and $p_{R,1}$ and $p_{R,2}$ be transmit power levels from $RN_1$ 210 to $MS_1$ 215 and $RN_2$ 210 to $MS_2$ 215, respectively. Furthermore, let $h_{1,1}$ be the channel model from $RN_1$ 210 to $MS_1$ 215, $h_{2,1}$ be the channel model from $RN_1$ 210 to $MS_2$ 217, $h_{1,2}$ be the channel model from $RN_2$ 212 to $MS_1$ 215, and $h_{2,2}$ be the channel model from $RN_2$ 212 to $MS_2$ 217. Additionally, let $w_1$ be a weighing vector for transmissions from BS 205 to $MS_1$ 210 and $w_2$ be a weighing vector for transmissions from BS 205 to $MS_2$ 212, and $g_1^*$ be a channel vector from BS 205 to $RN_1$ 210 and $g_2^*$ be a channel vector from BS 205 to $RN_2$ 212, where $w_1 g_2^* = w_2 g_1^* = 0$. Also, define the transmit power vector over the two-hop channel as $$p = (p_{B1}, p_{B2}, p_{R,1}, p_{R,2})$$

and a data rate over a hop as a function of channel quality y as $$C(x) = \log_2(1+y).$$

It is noted that the channel quality y for a channel may be defined as a function of the channel model h for the channel and the transmit power values p for the channel. It is noted that the data rate function used here reflects the Shannon capacity formula. Other functions based on derived different metrics could be used, such as the Effective Exponential SINR method, lookup table mapping the data rate with current radio conditions, and so forth.

Assumptions of model 200 include:

The same pair of MSs is served in the backhaul link and in the access link. In other words, no other link is served, although the extension to more served links, either relayed or not, is straightforward. In particular, scheduling may be performed with a number of strategies. Strategy 1—The BS determines the MS pair to be served and informs the RNs. Each RN does not need to know which MS is served by the other RN. Strategy 2—Each RN determines which MS it serves and informs the BS. Each RN does not need to know which MS is served by the other RN.

Both the RNs and the MSs are equipped with a single antenna, while the BS has at least two antennas.

Typically, the reception of transmissions not intended for a communications device at the communications device will have a negative impact on the performance of the communications device. Usually, the unintended transmission may show up as interference and/or noise in the intended transmission, thereby potentially causing errors, and reduced performance, such as lower throughput and/or lower coverage.

Therefore, there is a desire to reduce interference and/or noise in a multi-user communications system, and to adapt the link of each user to maximize each user's achievable data rate under the current radio conditions. However, in a communications system with RNs and multi-hop communications, an interference environment may be significantly different from an interferer environment in a communications system without RNs and communications occur only in single hops. For instance, a transmission from a BS to a MS may involve a transmission on a backhaul link from the BS to a RN, while on an access link, the RN and possibly the BS may transmit to the MS. Therefore, transmissions from the BS to the MS now consist of two or more hops. Additionally, achievable data rates on the backhaul link and the access link may be quite different.

A technique that may be used to improve performance in a multi-user communications system by reducing interference and/or noise is power control. Power control can reduce interference as well as ensure better transmission efficiency by adapting achievable data rates of each link.

However, in a multi-user communications system with RNs, a power control technique may need to consider both the transmit power of the BSs and of the RNs. Hence, a centralized power control technique may require a considerable amount of feedback information, which may negatively impact communications system performance due to increased overhead. Therefore, a power control technique that may consider BS and RN transmit power as well as reduce feedback information is needed.

Therefore, an objective of the power control techniques presented herein is to perform power control at the BSs and the RNs in a context of cooperative RN communications.

Figure 3:
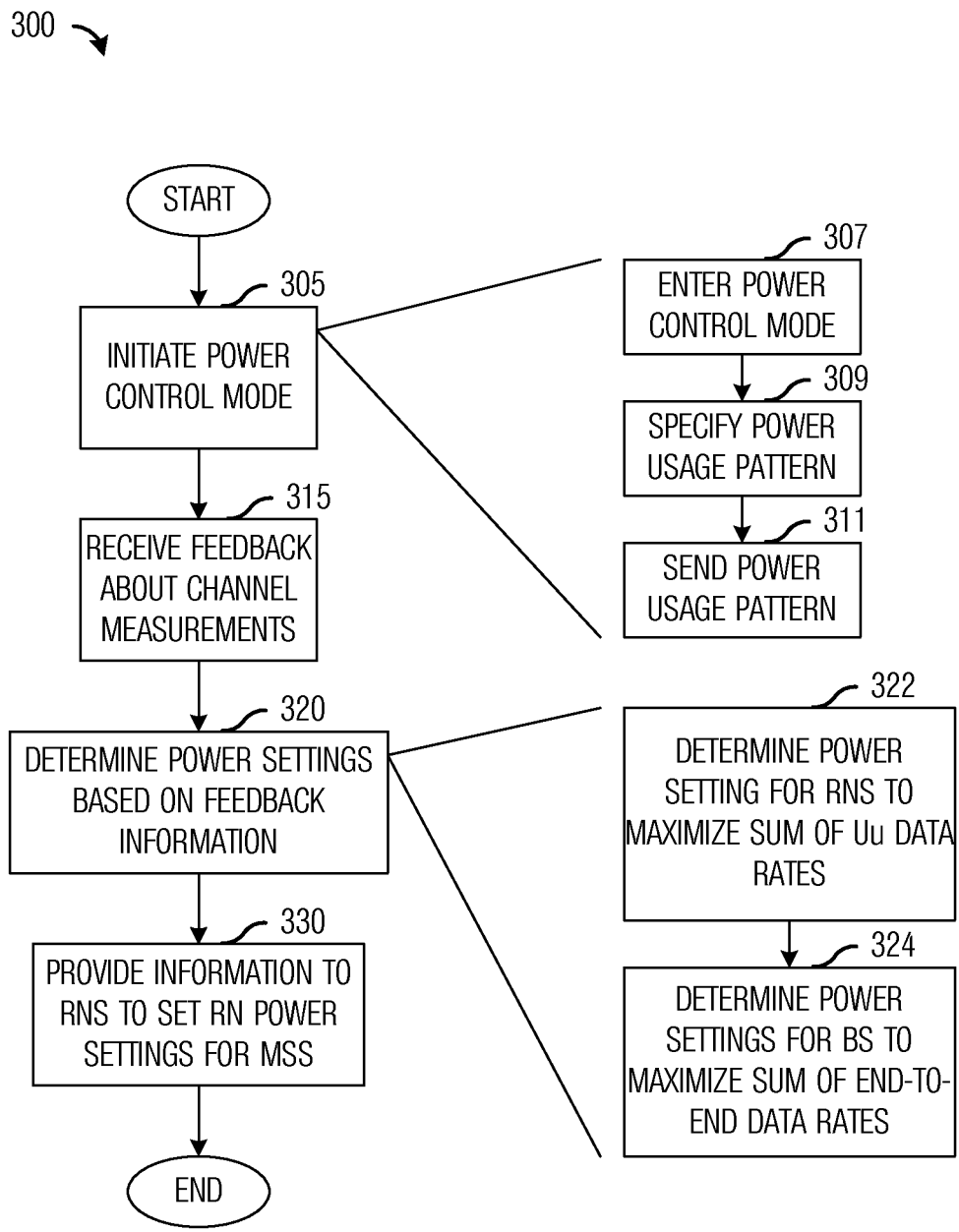
FIG. 3 illustrates an example flow diagram of BS operations in performing power control according to example embodiments described herein.

FIG. 3 illustrates a flow diagram of BS operations 300 in performing power control. BS operations 300 may be indicative of operations occurring in a BS, such as BS 105, as the BS performs power control for communications devices, such as RNs, served by the BS as well as for the BS itself. The power control performed by the BS may be targeted for power control of multi-hop communications, i.e., communications involving at least one RN in a communications path. BS operations 300 may occur while the BS is in a normal operating mode. BS operations 300 may also occur while some communications devices, such as MSs, are directly connected to the BS and are not using a RN to communicate. The BS may also serve other MSs in direct link communication. These users are not considered here, but the example embodiment can be used as described by, e.g., excluding these users and allocating them a separate power budget.

BS operations 300 may begin with the BS initiating a power control mode (block 305). According to an example embodiment, while in the power control mode, the BS along with the RNs and the MSs under its control may cooperate to determine and/or transmit power level settings for the BS and the RNs.

Initiating the power control mode may include entering the power control mode where the transmit power level settings are to be determined and/or adjusted to perform power control (block 307). According to an example embodiment, the BS may be configured to periodically perform power control or to perform power control at specific times such as every subframe, every frame, and so forth. Alternatively, the BS may be configured to perform power control upon an occurrence of an event or a trigger. Examples of events or triggers may include an error rate meeting an error threshold, a data rate meeting a data threshold, a handover rate meeting a handover threshold, an addition or deletion of a MS, an addition or deletion of a RN, or so on.

The BS may notify the RNs and MSs under its control to also enter the power mode by transmitting a message to the RNs and the MSs. Alternatively, the BS may send a message containing a time or specifying an event (such as a synchronization message, an occurrence of an error, an addition or deletion of a RN or MS, or so forth) and then when the time arrives or the event occurs, the RNs and the MSs (along with the BS) may enter the power control mode.

Since the power control involves the BS setting transmit power levels for the RNs transmitting to the MSs over the Uu link, which the BS may have no direct knowledge of, the BS may require information about the Uu link to help it set the transmit power levels for the RNs.

According to an example embodiment, the BS may make use of channel measurements, such as channel quality measurements, of the Uu link made by the MSs. Examples of channel quality measurements include a Signal to Interference plus Noise Ratio (SINR) measurement, a Signal to Noise Ratio (SNR) measurement, a received signal strength value, a measured bit error rate, a measured frame error rate, or so on. These channel measurements may need to be reported by the RN to the BS. Since the RNs generally transmit to the MSs at the same time, the transmissions may cause interference, which may cloud the channel measurements made by the MSs. Therefore, the BS may specify a power usage pattern for the RNs that specifies transmit power levels of transmissions made by the RNs to the MSs while operating in power control mode (block 309). The power usage pattern may comprise a sequence of bits where groups of one or more bits specify the transmit power level of a signal transmitted by the RN for a period of time, such as a specified number of network resources, slots, subframes, frames, superframes, a number of milli-seconds, or so on.

With the RNs transmitting at power levels based on a power usage pattern, MSs may make channel measurements. Since the BS knows the transmit power levels of the RNs, it may be simpler for the BS to set the transmit power levels for the RNs based on the channel measurements.

According to an example embodiment, each RN may have a different power usage pattern. The use of different power usage patterns at each RN may allow for the MSs to make channel measurements that are targeted towards measuring signal strength as well as interference from a single RN for several possible conditions. Therefore, if there are N RNs, then there may be N different power usage patterns.

Alternatively, depending on a distribution of RNs within a coverage area of a BS, a sectorized approach may be utilized by the BS to reduce a number of different power usage patterns. For example, since transmissions from RNs may be relatively low powered compared to transmissions from the BS, RNs in different regions of the coverage area of the BS may use the same power usage pattern without impacting the channel measurements made by their MSs.

As an illustrative example, consider a situation with a BS, two RNs, and two MSs as shown in FIG. 2, wherein the BS may specify the RNs to transmit with either one of two power levels (e.g., a high power level and a low power level, or a maximum power level and a minimum power level). Three special power usage pattern scenarios may be defined.

Scenario 1—$RN_1$ uses the maximum power and $RN_2$ uses the minimum power;
Scenario 2—$RN_1$ uses the minimum power and $RN_2$ uses the maximum power; and
Scenario 3—Both $RN_1$ and $RN_2$ use the maximum power.

Figure 4A:
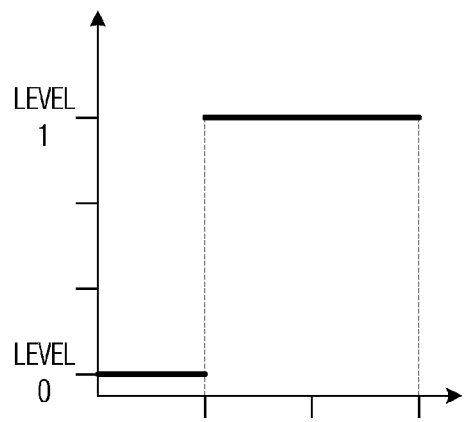
FIGS. 4a through 4d illustrate example power usage patterns according to example embodiments described herein.
Figure 4B:
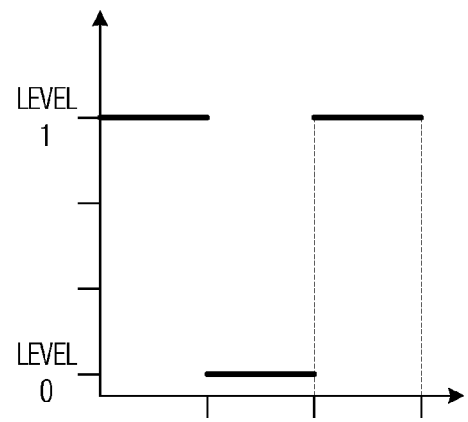
Figure 4C:
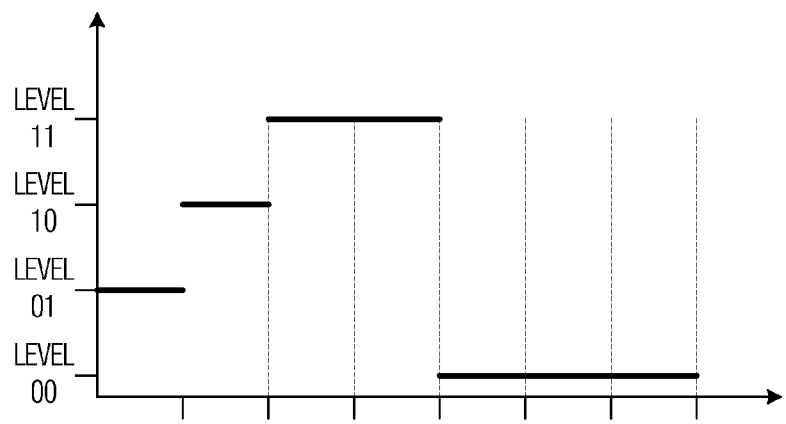
Figure 4D:
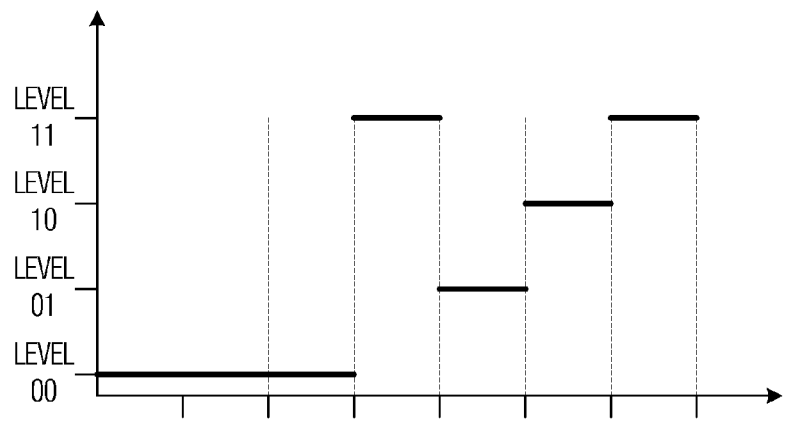

Based on the power usage pattern scenarios, exemplary power usage patterns such as power usage pattern one=(max, min, max) and power usage pattern two=(min, max, max) may be defined. Power usage pattern one specifies that in a first time interval, a RN is to transmit at a maximum power level, and then in a second and a third time interval, the RN is to transmit at a minimum power level and the maximum power level, respectively. Power usage pattern two specifies that a RN is to transmit at the minimum power level, the maximum power level, and the maximum power level for the first, the second, and the third time intervals, respectively. FIGS. 4a and 4b illustrate power usage patterns one and two. Other power usage patterns of greater or lesser length may be defined based on the power usage pattern scenarios. FIGS. 4c and 4d illustrate exemplary power usage patterns for a situation wherein the BS specifies two RNs to transmit with up to four power levels (e.g., power level 00, power level 01, power level 10, and power level 11). Other power usage patterns with four power levels are possible.

Referencing back to FIG. 3, the BS may send the power usage patterns to the RNs (block 311). According to an example embodiment, the BS may send the power usage pattern by transmitting bit strings representing the power usage pattern to each of the RNs. As an example, consider the BS transmitting power usage pattern one (max, min, max). Since there are two different transmit power levels, a single bit may be used to indicate the transmit power level. The BS may then send a bit string of "1 0 1" to a RN, where value '1' may be representative of a maximum power level and value '0' may be representative of a minimum power level. The BS may send a bit string to each RN, indicating the power usage pattern that the BS intends for the RN to use. Similarly, in a situation where a RN may transmit with one of four transmit power levels, two bits may be used to indicate the transmit power level.

The BS may individually send the power usage pattern for a RN to the RN or the BS may broadcast all the power usage patterns to all of the RNs along with an indication of which power usage pattern is to be used by which RN. As an example, the BS may broadcast a set of power usage patterns to all of the RNs and then send an indicator of a power usage pattern to each of the RNs, where the indicator indicates to the RN which power usage pattern in the set of power usage patterns the RN is to use. The indicators may be individually sent to the individual RNs or broadcast to all RNs with identifiers specifying which indicator belongs to which RN.

According to an example embodiment, an inter-cell interference coordination (ICIC) like signaling method may be used to send the power usage patterns. In the ICIC type signaling method, a power usage pattern for each subband (where the power usage pattern indicates which transmit power level to be used on each subband) may be sent to each RN. Then, the RN may send back a channel quality indication (CQI) message with information related to a channel measurement of the subband (or a subset of the subbands). Since the BS knows the power usage pattern for each RN, the BS may be able to determine the power of each RN.

The BS may receive feedback from the RNs related to the channel measurements made by the MSs (block 315). According to an example embodiment, the BS may receive information about SINR measurements of the Uu link from the RNs. The BS may receive raw SINR measurements from the RNs, aggregated SINR measurement information from the RNs, a function of the SINR measurements from the RNs, statistical information regarding the SINR measurements from the RNs, or so on. In order to help reduce feedback overhead, the feedback information may be quantized. In addition to or in place of the SINR measurements, the RNs may provide SNR measurements, a received signal strength value, a measured bit error rate, a measured frame error rate, statistical information, channel state information, or so forth.

The BS may also need to obtain information (such as channel quality measurements) about the Un link (i.e., the BS to RN link). The information about the Un link may be obtained by direct feedback from the RN, such as in the form of Channel Quality Indication (CQI) reports that would be sent in a 3GPP LTE communications system. Alternatively, in a TDD system, the information about the Un link may be derived using channel reciprocity. Furthermore, since RNs usually have fixed installations, the channels between the BS and the RNs generally do not change significantly over time. Therefore, it may be possible to separately measure the channels between the BS and the RNs and store the channel measurements at the BS for later use.

According to an example embodiment, the BS may receive power control commands and/or power control recommendations from the RNs. The power control commands and/or power control recommendations may provide specific transmit power levels for the RNs or adjustments to current transmit power levels for the RNs. As an example, based on its measurement of the Uu link, a MS may determine that the BS should increase the transmit power level of the MS's serving RN.

The BS may determine transmit power settings (or updates to the transmit power settings) for the RNs as well as itself based on the feedback information (block 320). According to an example embodiment, the BS may maximize a sum of achievable data rates over the Uu link, i.e., the access link, to determine the transmit power settings for the RNs (block 322). The maximizing of the sum of achievable data rates over the Uu link may be based on channel measurements of the Uu link reported to the BS by the RNs.

In general, for a given channel coding scheme and a given multi-antenna transmission scheme, an achievable data rate on a channel is determined in part by the channel's quality (e.g., its SINR) as well as its allocated transmit power. The communications devices may be able to infer the data rate on the channel, usually using the channel's quality. As an illustrative example, considering a multi-carrier system, a technique such as an Exponential Effective SINR Mapping method (EESM) may be used to derive a raw bit rate that can be carried on a channel. The actual bit rate may then be inferred by subtracting various overheads, such as, reference sequence overhead, control channel overhead and so forth. Furthermore, a transmitter of a communications device may adapt its transmission parameters, such as, modulation, channel coding rate, transmission rank, and so on, so that the chosen bit rate corresponds to the channel's quality.

The BS may also determine transmit power settings for its own transmissions to the RNs by maximizing a sum of end-to-end data rates (block 324). The maximizing of the sum of end-to-end data rates may be based on channel measurements of the Uu link and the Un link. As discussed previously, the channel measurements of the Un link may be made by the RNs and provided by to the BS or through channel reciprocity techniques based on channel measurements made by the BS itself.

According to an example embodiment, the BS determines the transmit power settings or updates to the transmit power settings in order to improve a sum of the achievable data rates for transmissions between the BS and the MSs (over both the Un link and the Uu link). The BS may improve the sum of the achievable data rates over both links by providing rate-matching between the Un link and the Uu link as well as considering intra-cell interference mitigation.

According to another embodiment, the BS may decide to modify the amount of resources in order to improve a sum of the achievable data rates for transmissions between the BS and the MSs (over both the Un link and the Uu link). The BS may increase the achievable data rate of a link by allocating more resources to the link by allocating more time symbols, more frequency resource blocks, or both time symbols and frequency resource blocks, for example.

Advantages of improving the sum of the achievable data rates over both links by providing rate-matching as disclosed herein include:

- Feedback of channel state information for the Un link to the BS may not be needed;
- Limiting a total number of transmit power levels for the RNs helps to simplify the setting of the transmit power levels. It is noted that increasing the number of transmit power levels may help to improve performance but with increased overhead; and
- Overall performance is close to that of a centralized power control technique with significantly less overhead.

According to an example embodiment, determining the transmit power settings or updates to the transmit power settings in order to improve a sum of the achievable data rates for transmissions between the BS and the MSs may first involve considering power control at the RNs to maximize a sum of achievable data rates of the Uu link.

As an illustrative example, using the terminology defined in FIG. 2 and further defining $M_1$ and $M_2$ as the noise powers from $MS_1$ 215 and $MS_2$ 217, respectively, defining an optimization problem for maximizing the sum of the achievable data rates for the Uu link may be expressible as:

$$\max_{p_{R,1}, p_{R,2}} \log\left(1 + \frac{p_{R,1}|h_{1,1}|^2}{p_{R,2}|h_{1,2}|^2 + M_1}\right) + \log\left(1 + \frac{p_{R,2}|h_{2,2}|^2}{p_{R,1}|h_{2,1}|^2 + M_2}\right).$$

It is noted that if both RNs do not transmit at their maximum power level, a scaling factor that is greater than one may be used to increase the transmit power level at the RNs so that at least one of the RN is transmitting at its maximum power level. The use of the scaling factor may increase both the transmit power level and an interference power at a MS, but a ratio of the transmit power level and the interference power remains constant. A noise power, however, is kept constant. Therefore the achievable data rate increases. Hence, to maximize the sum of the achievable data rates for the Uu link, at least one RN may need to transmit at its maximum transmit power level.

It is also noted that the data rates in the previous equation are theoretical information capacity rates. A practical system may choose to use other data rates, such as measured data rate, data rate determined from the modified Shannon limit model, the exponential effective SINR method, and so forth.

It is further noted that if one RN is transmitting at its maximum transmit power level, then in order to maximize the sum of the achievable data rates for the Uu link, the other RN may need to use either its maximum transmit power level or its minimum transmit power level.

Therefore, in order to maximize the sum of the achievable data rates for the Uu link, it may be sufficient to use ON-OFF power control, wherein the ON state corresponds to the maximum transmit power level and the OFF state corresponds to the minimum transmit power level, with at least one RN is in the ON state.

Based on the feedback information of the channel measurements of the Uu link, the BS may determine the transmit power allocated to the RNs to maximize the sum of the end-to-end achievable data rates (block 322). It is noted that the maximization of the sum of the achievable data rates for the Uu link may not directly imply that there is a maximization of the sum of the end-to-end achievable data rates, however, there is a close correspondence.

With the transmit power levels of the RNs determined, the BS may determine transmit power settings of the BS to maximize the sum of the end-to-end achievable data rates based on the feedback information of the channel measurements of the Uu link (block 324). Let $P_{sum}$ be a maximum sum of the transmit powers at the BS and $P_{min}$ be the minimum transmit power at the BS allocatable to a transmission to each MS. Both $g_1^*$ and $g_2^*$ are available at the BS, e.g., by feedback from the RNs. Let $N_1$ and $N_2$ be noise vectors at the first RN and at the second RN, respectively. The BS may determine the following values $$a_1 = \frac{|g_1^* w_1|^2}{N_1} \text{ and } a_2 = \frac{|g_2^* w_2|^2}{N_2}.$$

Let $b_1^{(k)}$ and $b_2^{(k)}$ be the received SINR values at the first MS and the second MS for a k-th combination of transmit power levels at the RNs, respectively. The determination of the transmit power settings of the BS may be formulated as an optimization problem expressible as $$\max_{P_{min} \leq x \leq P_{sum} - P_{min}} \min \{\log(1+ax), \log(1+b_1^{(k)})\} + \min\{\log(1+a_2(P_{sum}-x)), \log(1+b_2^{(k)})\}.$$

Adding auxiliary variables, the above optimization is equivalent to the following $$\min_{(x,u,v)} -u - v$$
$$\text{s.t.} \quad u \leq \log(1 + b_1^{(k)})$$
$$u \leq \log(1 + a_1 x)$$
$$v \leq \log(1 + b_2^{(k)})$$
$$v \leq \log(1 + a_2(P_{sum} - x))$$
$$P_{min} \leq x \leq P_{sum} - P_{min}.$$

Let $(\lambda_1, \lambda_2, \lambda_3, \lambda_4)$ be dual variables corresponding to the first four constraints shown above, with Karush-Kuhn-Tucker (KKT) conditions for solving nonlinear problems are expressible as $$\lambda_1 + \lambda_2 = 1,$$
$$\lambda_3 + \lambda_4 = 1, \text{ and}$$
$$\frac{a_1 \lambda_2}{a_1 x + 1} = \frac{a_2 \lambda_4}{a_2(P_{sum} - x) + 1}.$$

It is noted that the dual variables must be nonnegative. Along with the first two KKT conditions, the dual variables must be between [0, 1]. From the third KKT condition, either $\lambda_2$ and $\lambda_4$ are zeros or $\lambda_2$ and $\lambda_4$ are positive numbers between [0, 1]. Therefore, the following situations may be possible for the dual variables:

case 1: $\lambda_1 = \zeta_3 = 1$ and $\lambda_2 = \lambda_1 = 0$
case 2: $\lambda_1 = \lambda_3 = 0$ and $\lambda_2 = \lambda_4 = 1$
case 3: $\lambda_1$ and $\lambda_2 \in (0, 1)$ and $\lambda_4 \in (0, 1]$
case 4: $\lambda_3$ and $\lambda_4 \in (0, 1)$ and $\lambda_2 \in (0, 1]$.

The BS may solve for x and then checks the result with a feasibility condition expressible as $$P_{min} \leq x \leq P_{sum} - P_{min}.$$

The BS may solve for x based on the values of the dual variables $(\lambda_1, \lambda_2, \lambda_3, \lambda_4)$. For the values of the dual variables meeting the conditions for case 1 shown above, the BS may check to see if the following condition is satisfied $$\max\left\{P_{min}, \frac{b_1^{(k)}}{a_1}\right\} \leq \min\left\{P_{sum} - P_{min}, P_{sum} - \frac{b_2^{(k)}}{a_2}\right\}.$$

If the condition is met, then candidate values for the transmit power levels at the BS are expressible as $$p_{1,<1>}^{(k)} = 0.5\left[\max\left\{P_{min}, \frac{b_1^{(k)}}{a_1}\right\} \leq \min\left\{P_{sum} - P_{min}, P_{sum} - \frac{b_2^{(k)}}{a_2}\right\}\right],$$
$$p_{2,<1>}^{(k)} = P_{sum} - p_{1,<1>}^{(k)}.$$

For the values of the dual variables meeting the conditions for case 2 shown above, the BS may first determine the following value $$x_2 = 0.5\left[P_{sum} - \left(\frac{1}{a_1} - \frac{1}{a_2}\right)\right].$$

The BS may check to see if the following condition is satisfied $$\max\left\{P_{min}, P_{sum} - \frac{b_2^{(k)}}{a_2}\right\} \leq x_2 \leq \min\left(P_{sum} - P_{min}, \frac{b_1^{(k)}}{a_1}\right).$$

If the condition is met, then candidate values for the transmit power levels at the BS are expressible as $$p_{1,<2>}^{(k)} = x_2 \text{ and } p_{2,<2>}^{(k)} = P_{sum} - p_{1,<2>}^{(k)}.$$

For the values of the dual variables meeting the conditions for case 3 shown above, the BS may check to see if the following condition is met $$\max\left\{P_{min}, P_{sum} - \frac{b_2^{(k)}}{a_2}\right\} \leq \frac{b_1^{(k)}}{a_1} \leq P_{sum} - P_{min}.$$

If the condition is met, then candidate values for the transmit power levels at the BS are expressible as $$p_{1,<3>}^{(k)} = \frac{b_1^{(k)}}{a_1} \text{ and } p_{2,<3>}^{(k)} = P_{sum} - p_{1,<3>}^{(k)}.$$

For the values of the dual variables meeting the conditions for case 4 shown above, the BS may check to see if the following condition is met $$P_{min} \leq P_{sum} - \frac{b_2^{(k)}}{a_2} \leq \min\left\{P_{sum} - P_{min}, \frac{b_1^{(k)}}{a_1}\right\}.$$

If the condition is met, then candidate values for the transmit power levels at the BS are expressible as $$p_{1,<4>}^{(k)} = P_{sum} - \frac{b_2^{(k)}}{a_2} \text{ and } p_{2,<4>}^{(k)} = P_{sum} - p_{1,<4>}^{(k)}.$$

For each combination of transmit power levels at the two RNs, the BS may compute a sum of the end-to-end achievable data rates for the four cases of the dual variables. The BS may select the dual variable case with the largest sum of the end-to-end achievable data rate. Hence, for a given value of k, the BS solves for $$m_k = \arg\max_{m=1,\ldots,4} S(p_{1,<m>}^{(k)}, p_{2,<m>}^{(k)}),$$

where $S(p_{1,<m>}^{(k)}, p_{2,<m>}^{(k)})$ is a sum of the end-to-end achievable data rate for the m-th case for the k-th combination of the transmit power levels at the two RNs.

It is noted that for the ON-OFF power control configuration as discussed previously, there may be three possible combinations of transmit power levels at the two RNs (e.g., <ON, ON>, <ON, OFF>, and <OFF, ON> for <$RN_1$, $RN_2$>). It is noted that ON-OFF power control may also be referred to as MAX-MIN power control where ON corresponds to MAX and OFF corresponds to MIN. The BS may select the combination of the transmit power levels at the two RNs with the largest sum of the end-to-end achievable data rates among all the possible combinations of the transmit power levels at the two RNs as $$k = \arg\max_{k=1,2,3} S(p_{1,<m_k>}^{(k)}, p_{2,<m_k>}^{(k)}).$$

As an example, the BS may determine indices (e.g., 0 or 1 (representative of ON or OFF)) for the two RNs corresponding to the k*-th combination of the transmit powers at the two RNs (block 322).

The BS may provide information to the RNs related to their transmit power levels as determined by the BS in block 320 (block 330). According to an example embodiment, the BS may provide feedforward information to the RNs. As an example, if ON-OFF power control is used, the BS may provide a single bit of information to each RN to indicate their transmit power level. While, if multi-level power control is used, the BS may provide multiple bits of information to each RN to indicate their transmit power level. As an illustrative example, if four transmit power levels are available for the RNs, then the BS may provide two bits of information to each RN. Similarly, if eight transmit power levels are available, then three bits of information may be provided to each RN. In general, with J transmit power levels, $\log_2 J$ bits may be provided to each RN to indicate the transmit power level of the RNs.

According to an example embodiment, with ON-OFF power control, the transmit power level of the RN may be implicitly signaled in a downlink network resource grant (DL grant). As an example, if OFF (minimum transmit power level) corresponds to a null value, then being allocated network resources may correspond to ON (maximum transmit power level). It is noted that more than two power levels may be used with additional signaling.

Figure 5:
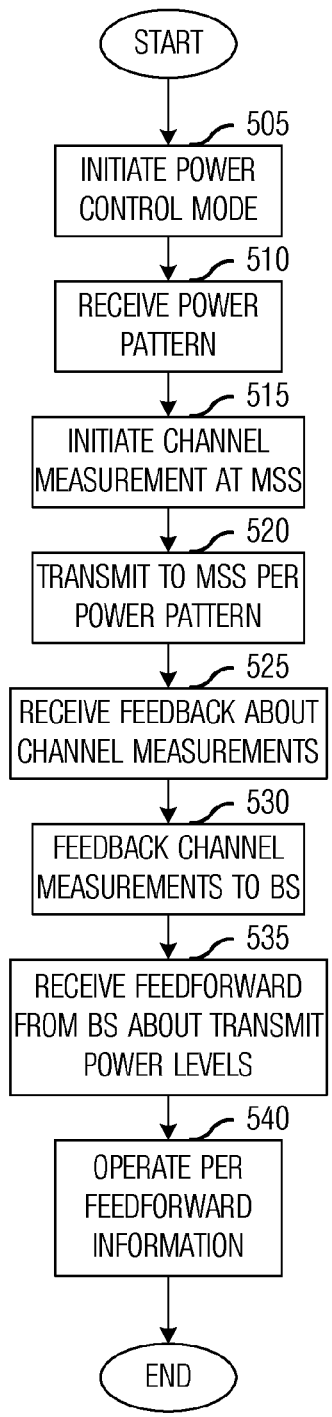
FIG. 5 illustrates an example flow diagram of RN operations in performing power control according to example embodiments described herein.

FIG. 5 illustrates a flow diagram of RN operations 500 in performing power control. RN operations 500 may be indicative of operations occurring in a RN, such as RN 110, as the RN performs power control. The power control performed by the RN may be targeted for power control of multi-hop communications, i.e., communications involving at least one RN in a communications path. RN operations 500 may occur while the RN is in a normal operating mode.

RN operations 500 may begin with the RN initiating a power control mode (block 505). According to an example embodiment, the RN may initiate the power control mode after receiving a notification from a BS controlling the RN, where the notification comprises instruction to enter the power control mode. The notification from the BS may be in the form of a message instructing the RN to enter the power control mode. Alternatively, the notification from the BS may be in the form of a message containing a time or specifying an event (such as a synchronization message, an occurrence of an error, an addition or deletion of a RN or MS, or so forth) and then when the time arrives or the event occurs, the RN (along with the BS and MSs) may enter the power control mode.

The RN may receive a power usage pattern that specifies the RN's transmission power levels during the power control mode from the BS (block 510). The power usage pattern may comprise a sequence of bits where groups of one or more bits specify the transmit power level of a signal transmitted by the RN for a period of time, wherein the signal may be used by each of the RN's MSs to measure the Uu link between the RN and the MS. For example, consider a situation wherein ON-OFF power control is used, then the power usage pattern may be a sequence of bits where each bit may specify the transmit power level of the RN for a single period of time. Similarly, if a four level power control technique is used, then the power usage pattern may be a sequence of bits wherein each group of two bits may specify the transmit power level of the RN for a single period of time.

The RN may initiate channel measurements by the MSs (block 515). According to an example embodiment, the RN may initiate channel measurements by the MSs by sending a message to the MSs instructing them to begin making channel measurements. The RN may send individual messages to each of its MSs or the RN may broadcast a message to all of its RNs. The message may specify what the MSs are to measure (such as SINR, SNR, received signal strength, and so forth), measurement duration, whether or not to perform measurement averaging, and so on.

The RN may transmit a signal, such as a pilot, a reference signal, a preamble, or so on, to assist the MSs in their measurements (block 520). According to an example embodiment, the RN may transmit the signal at a transmit power level as specified by its power usage pattern. As an illustrative example, if ON-OFF power control is used and the power usage pattern for the RN is (ON, OFF, ON), then in a first specified time period, the RN transmits the signal at a maximum power level, then the RN transmits the signal at a minimum power level in a second specified time period and then at the maximum power level at a third specified time period.

The RN may receive as feedback information about channel measurements made by its MSs (block 525). According to an example embodiment, the RN may receive raw channel measurement information, such as SINR, SNR, a received signal strength, a measured bit error rate, a measured frame error rate, and so on, from the MSs. Alternatively, the RN may receive information based on the channel measurements made by the MSs, for example, the RN may receive channel state information, channel quality indicators, channel statistics, a subset of channel statistics, a function of channel statistics, and so forth. The feedback information may be quantized to help reduce feedback overhead. Alternatively, the RN may receive power control commands and/or power control recommendations from the MSs.

According to an example embodiment, the RN may receive feedback information at the end of each specified time period. For example, after a first specified time period, the RN may receive feedback information about channel measurements made during the first specified time period. Similarly, after a second specified time period, the RN may receive feedback information about channel measurements made during the second specified time period. Alternatively, the RN may receive feedback information after a specified number of time periods.

Alternatively, the RN may receive feedback information after the power usage pattern completes. For example, if the power usage pattern is specified for four time periods, then the RN may receive feedback information for channel measurements made by the MSs in all four time periods after the end of the fourth time period.

The RN may provide the feedback information received from the MSs to the BS (block 530). According to an example embodiment, the RN may provide the feedback information to the BS without modification. According to an example embodiment, the RN may process (e.g., aggregate, apply a function, discard a number of less important values, and so on) the feedback information prior to providing it to the BS. Alternatively, from the feedback information received from the MSs, the RN may generate power control commands and/or power control recommendations for the BS. The RN may quantize the feedback information prior to providing it to the BS.

The RN may receive feedforward information about transmit power levels from the BS (block 535). According to an example embodiment, the feedforward information from the BS may specify a transmit power level for the RN. The feedforward information may be in the form of one or more bits that specifies the transmit power level for the RN. As an example, if ON-OFF power control is used, the RN may receive a single bit of information that indicates its transmit power level. While, if multi-level power control is used, the RN may receive multiple bits of information that indicates its transmit power level. As an illustrative example, if four transmit power levels are available for the RNs, then the RN receive two bits of information. Similarly, if eight transmit power levels are available, then three bits of information may be received by each RN. In general, with J transmit power levels, $\log_2 J$ bits may be received by each RN to indicate the transmit power level of the RN. In addition, the feedforward information may comprise information about the modulation/coding scheme to use, the channel coding rate to use, the transmission rank to use, and so forth.

The RN may transmit to the MSs using the specified transmit power level (block 540). The RN may continue to transmit at the specified transmit power level until it receives additional feedforward information from the BS specifying a different transmit power level.

The power control techniques for multi-hop communications presented herein may be implemented with low overhead since the power control techniques do not need to be performed continually. Instead, the transmit power levels may be determined and/or updated iteratively and potentially only when performance problems are encountered. Furthermore, the BS may attempt to determine and/or update the transmit power levels for one RN or a subset of the RN instead of all of the RNs. The BS may receive feedback information for MSs of the single RN or the subset of RNs and examine the feedback information to determine if power control for all of the RNs is feasible or beneficial. In other words, the BS may control the rate of power adaptation.

Figure 6:
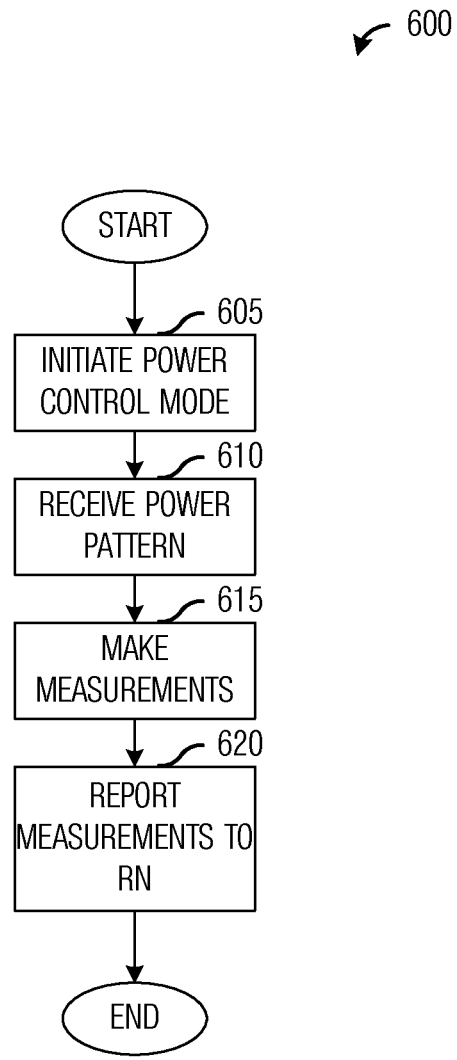
FIG. 6 illustrates an example flow diagram of MS operations in performing power control according to example embodiments described herein.

FIG. 6 illustrates a flow diagram of MS operations 600 in performing power control. MS operations 600 may be indicative of operations occurring in a MS, such as MS 115, as the MS performs power control. The power control performed by the RN may be targeted for power control of multi-hop communications, i.e., communications involving at least one RN in a communications path. MS operations 600 may occur while the MS is in a normal operating mode.

MS operations 600 may begin with the MS initiating a power control mode (block 605). According to an example embodiment, the MS may initiate the power control mode after receiving a notification from a RN controlling the MS, where the notification comprises instruction to enter the power control mode. The notification from the RN may be in the form of a message instructing the MS to enter the power control mode. Alternatively, the notification from the RN may be in the form of a message containing a time or specifying an event (such as a synchronization message, an occurrence of an error, an addition or deletion of a RN or MS, or so forth) and then when the time arrives or the event occurs, the MS (along with the BS and RNs) may enter the power control mode.

The MS may receive a power usage pattern from the RN (block 610). As discussed previously, the power usage pattern may specify the RN's transmission power levels during the power control mode. The MS may use the power usage pattern as specified for the RN to help it perform channel measurements of the Uu link (block 615). The MS may make measurements, such as SINR, SNR, signal strength, error rate, and so on, of the Uu link.

The MS may report information about the channel measurements to the RN for each of the power levels included in the power usage pattern (block 620). According to an example embodiment, the MS may send raw channel measurement information, such as SINR, SNR, signal strength, error rate, and so on, to the RN. Alternatively, the MS may send information based on the channel measurements, for example, the MS may receive channel state information, channel quality indicators, channel statistics, a subset of channel statistics, a function of channel statistics, and so forth. The feedback information may be quantized to help reduce feedback overhead. Alternatively, the MS may send power control commands and/or power control recommendations to the RN.

Figure 7:
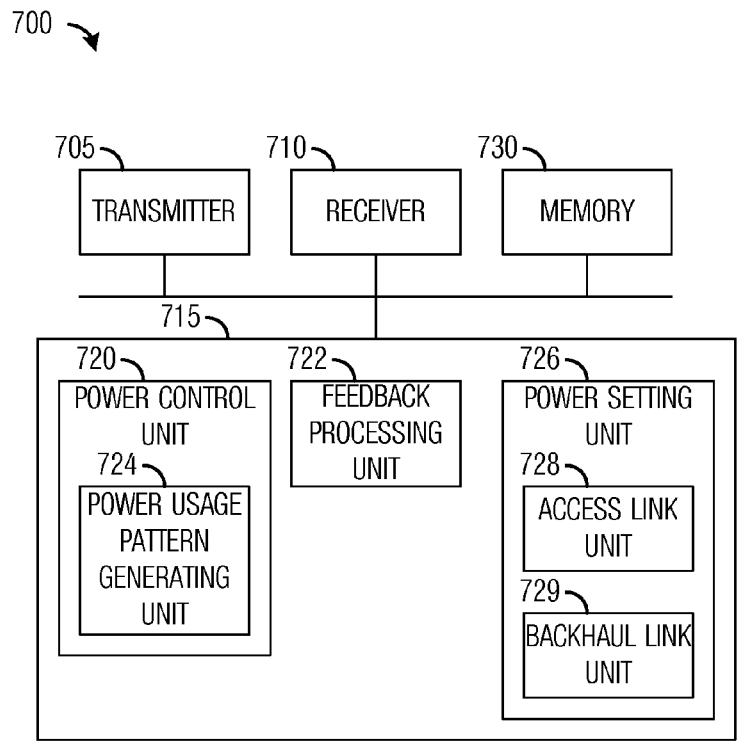
FIG. 7 provides an example communications device according to example embodiments described herein.

FIG. 7 provides an illustration of a communications device 700. Communications device 700 may be an implementation of a communications controller, such as a BS, a macro cell, a low power cell, or so on. Communications device 700 may be used to implement various ones of the embodiments discussed herein. As shown in FIG. 7, a transmitter 705 is configured to transmit information and a receiver 710 is configured to receive information. Transmitter 705 receiver 710 may have a wireless interface, a wireline interface, or a combination thereof. In practice, transmitter 705 and receiver 710 might be implemented in a single unit of hardware.

A power control unit 720 is configured initiate a power control mode that sets transmit power levels for both a communications controller and its relay nodes based on feedback information regarding channel measurements of an access link between the relay nodes and their mobile stations. Power control unit 720 may include a power usage pattern generating unit 724 is configured to generate a power usage pattern for relay nodes controlled by communications device 700, which may be used by the relay nodes to transmit signals during the power control mode. Although shown as being located within power control unit 720, power usage pattern generating unit 724 may be a separate entity. A feedback processing unit 722 is configured to process feedback information related to the channel measurements. Feedback processing unit 722 may process, such as aggregate, apply a function, discard less important values, reconstruct, dequantize, and so forth, the feedback information.

A power setting unit 726 is configured to determine and/or update transmit power levels for the communications controller and its relay nodes in a multi-hop communications system. Power setting unit 726 determines transmit power level settings for relay nodes based on first hop channel measurements and equalizes a sum of data rates for the hops in a communications path based on second hop channel measurements. Power setting unit 726 includes an access link unit 728 and a backhaul link unit 729. Access link unit 728 is configured to determine access link transmit power levels based on the information related to channel measurements of the access links, and backhaul link unit 729 is configured to determine backhaul link transmit power levels based on information related to channel measurements of backhaul links and the access links. A memory 730 is configured to store transmit power levels, feedback information, power usage patterns, and so forth.

The elements of communications device 700 may be implemented as specific hardware logic blocks. In an alternative, the elements of communications device 700 may be implemented as software executing in a processor, microprocessor, digital signal processor, controller, application specific integrated circuit, or so on. In yet another alternative, the elements of communications device 700 may be implemented as a combination of software and/or hardware.

As an example, transmitter 705 and receiver 710 may be implemented as a specific hardware block, while power control unit 720, feedback processing unit 722, power usage pattern generating unit 724, power setting unit 726, access link unit 728, and backhaul link unit 729 may be software modules executing in a processor 715, such as a microprocessor, a digital signal processor, a custom circuit, or a custom compiled logic array of a field programmable logic array.

Figure 8:
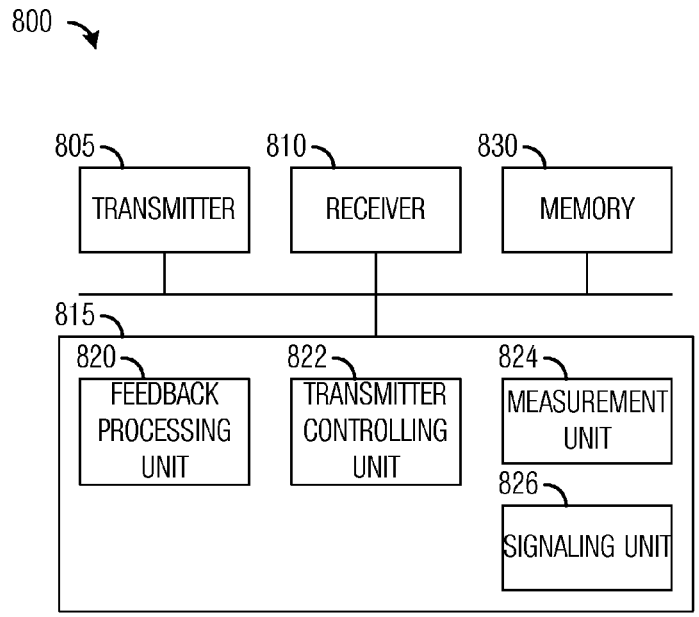
FIG. 8 provides an example alternate communications device according to example embodiments described herein.

FIG. 8 provides an illustration of a communications device 800. Communications device 800 may be an implementation of a RN. Communications device 800 may be used to implement various ones of the embodiments discussed herein. As shown in FIG. 8, a transmitter 805 is configured to transmit information and a receiver 810 is configured to receive information. Transmitter 805 and receiver 810 may have a wireless interface, a wireline interface, or a combination thereof. In practice, transmitter 805 and receiver 810 might be implemented in a single unit of hardware.

A feedback processing unit 820 is configured to process feedback information related to the channel measurements. Feedback processing unit 820 may process, such as aggregate, apply a function, discard less important values, reconstruct, unquantize, and so forth, the feedback information. A transmitter controlling unit 822 is configured to set transmit power levels of transmitter 805 based on a power usage pattern and/or transmit power configuration information provided by a communications controller. A measurement unit 824 is configured to initiate channel measurements at communications devices coupled to communications device 800. Measurement unit 824 is further configured to a type of channel measurements performed by the communications devices. A signaling unit 826 is configured to send signals at transmit power levels that communications devices may use to perform channel measurements. A memory 830 is configured to store transmit power levels, feedback information, power usage patterns, and so forth.

The elements of communications device 800 may be implemented as specific hardware logic blocks. In an alternative, the elements of communications device 800 may be implemented as software executing in a processor, microprocessor, digital signal processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while feedback processing unit 820, transmitter controlling unit 822, measurement unit 824, and signaling unit 826 may be software modules executing in a processor 815, such as a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for power control in a multi-hop communications system, the method comprising:
    transmitting a power usage pattern for each relay node in a subset of relay nodes served by a communications controller, wherein the power usage pattern specifies transmit power levels for the relay node while the relay node is operating in a power control mode;
    receiving channel measurements of access links between each relay node in the subset of relay nodes and subscriber equipment served by the relay node;
    determining backhaul link transmit power levels and access link transmit power levels based on the channel measurements of access links and channel measurements of backhaul links between the communications controller and each relay node in the subset of relay nodes; and
    transmitting the access link power levels to the subset of relay nodes.

2. The method of claim 1, further comprising determining the channel measurements of backhaul links between the communications controller and each relay node in the subset of relay nodes.

3. The method of claim 2, wherein determining the channel measurements of backhaul links comprises receiving the channel measurements of the backhaul links from each relay node in the subset of relay nodes.

4. The method of claim 1, further comprising transmitting information to the subset of relay nodes in accordance with the backhaul link transmit power levels.

5. The method of claim 1, wherein at least one relay node in the subset of relay nodes is a subscriber equipment.

6. The method of claim 1, wherein a different power usage pattern is transmitted to each relay node in the subset of relay nodes.

7. The method of claim 1, wherein determining the backhaul link transmit power levels and the access link transmit power levels comprises:

determining access link transmit power levels based on the channel measurements of the access links; and determining backhaul link transmit power levels based on the channel measurements of the backhaul links and the channel measurements of the access links.

8. The method of claim 7, wherein determining the access link transmit power levels comprise maximizing an achievable data rate over the access links.

9. The method of claim 8, wherein maximizing the achievable data rate comprises solving an optimization problem.

10. The method of claim 7, wherein determining the backhaul link transmit power levels comprise equalizing a data rate of the access links with a data rate of the backhaul links.

11. The method of claim 10, wherein the determining the backhaul link transmit power levels comprises maximizing a sum of end-to-end achievable data rates, wherein an end-to-end achievable data rate comprises a sum of an achievable data rate of an access link and an achievable data rate of a backhaul link for a single multi-hop transmission path.

12. The method of claim 1, wherein the channel measurements of access links comprises signal to interference plus noise ratio values, signal to noise ratio values, statistical information, channel state information, interference level, data rate, or a combination thereof.

13. The method of claim 1, wherein the channel measurements of access links are determined by the subscriber equipment.

14. The method of claim 1, wherein transmitting the transmit power levels for each relay node comprises transmitting indications of the transmit power levels to the relay node.

15. A method for relay node operations, the method comprising:

receiving a power usage pattern specifying transmit power levels for a relay node;

transmitting a signal based on the power usage pattern to assist subscriber equipment served by the relay node in making channel measurements;

receiving the channel measurements from the subscriber equipment;

sending the channel measurements to a communications controller serving the relay node;

receiving a transmit power level from the communications controller; and transmitting at the transmit power level to the subscriber equipment.

16. The method of claim 15, further comprising processing the channel measurements prior to sending the channel measurements to the communications controller.

17. The method of claim 16, wherein the processing comprises aggregating the channel measurements, quantizing the channel measurements, eliminating portions of the channel measurements, applying a function to the channel measurements, or a combination thereof.

18. The method of claim 15, wherein the signal comprises a pilot signal, a reference signal, or a preamble.

19. The method of claim 15, wherein the power usage pattern specifies transmit power levels as a function of time, and wherein the transmitting the signal comprises transmitting the signal at a transmit power level and at a time in accordance with the power usage pattern.

20. The method of claim 15, wherein receiving the transmit power level comprises receiving an indication of the transmit power level.

21. A communications controller comprising:

a transmitter configured to transmit a power usage pattern for each relay node in a subset of relay nodes served by a communications controller, wherein the power usage pattern specifies transmit power levels for the relay node while the relay node is operating in a power control mode, and configured to transmit access link power levels to the subset of relay nodes;

a receiver configured to receive channel measurements of access links between each relay node in the subset of relay nodes and subscriber equipment served by the relay node; and a processor coupled to the transmitter and to the receiver, the processor configured to determine backhaul link transmit power levels and access link transmit power levels based on the channel measurements of access links and channel measurements of backhaul links between the communications controller and each relay node in the subset of relay nodes.

22. The communications controller of claim 21, wherein the processor is further configured to determine the channel measurements of backhaul links between the communications controller and each relay node in the subset of relay nodes.

23. The communications controller of claim 21, wherein the processor is configured to determine the access link transmit power levels based on the channel measurements of the access links, and wherein the processor is configured to determine the backhaul link transmit power levels based on the channel measurements of backhaul links and channel measurements of the access links.

24. The communications controller of claim 21, wherein the processor is further configured to specify a power usage pattern for each relay node in the subset of relay nodes.

* * * * *